United States Patent [19]
Yagi et al.

[11] Patent Number: 6,102,603
[45] Date of Patent: Aug. 15, 2000

[54] HOUSING HAVING PROTRUSIONS TO BIND WITH MOLDS FOR MOLDING INTEGRAL PACKING RING

[75] Inventors: Sakai Yagi; Masanori Tsuji; Motohisa Kashiyama; Takuya Kitamura, all of Haibara-gun, Japan

[73] Assignee: Yazaki Corporation, Tokyo, Japan

[21] Appl. No.: 09/098,558

[22] Filed: Jun. 17, 1998

Related U.S. Application Data

[62] Division of application No. 08/961,071, Oct. 30, 1997, Pat. No. 5,846,468, which is a continuation of application No. 08/506,337, Jul. 24, 1995, abandoned.

[30] Foreign Application Priority Data

Jul. 26, 1994 [JP] Japan .................................. 6-173783

[51] Int. Cl.[7] ...................................................... F16B 1/00
[52] U.S. Cl. ............................ 403/24; 403/288; 277/636
[58] Field of Search .................................. 403/288, 375, 403/24; 285/294.3, 296.1; 264/267, 268, 273, 275, 276, 250, 255, 328.7, 328.8, 328.9; 439/271; 277/636, 924

[56] References Cited

U.S. PATENT DOCUMENTS

| | | | |
|---|---|---|---|
| 246,092 | 8/1881 | Dennis | 285/296.1 |
| 3,341,647 | 9/1967 | Aberle . | |
| 4,021,524 | 5/1977 | Grimsley | 264/267 X |
| 4,259,283 | 3/1981 | Greutert et al. | 264/273 X |
| 4,410,479 | 10/1983 | Cyriax | 264/267 X |
| 4,556,226 | 12/1985 | Ito . | |
| 4,842,540 | 6/1989 | Endo et al. . | |
| 5,023,041 | 6/1991 | Jones et al. | 264/328.7 X |
| 5,263,871 | 11/1993 | Sano . | |
| 5,846,468 | 12/1998 | Yagi et al. | 264/268 |

FOREIGN PATENT DOCUMENTS

| | | |
|---|---|---|
| 38 07 797 | 10/1988 | Germany . |
| 3-219578 | 9/1991 | Japan . |
| 63-221568 | 9/1991 | Japan . |

OTHER PUBLICATIONS

German Office Action of Official File No. 195 25 773.1, Jan. 21, 1997 with translation.

*Primary Examiner*—Harry C. Kim
*Attorney, Agent, or Firm*—Armstrong, Westerman, Hattori, McCleland & Naughton

[57] ABSTRACT

A method of manufacturing a waterproof connector housing, that enables the formation of a uniform packing ring which is an integral part of the housing by engaging a hollow body of a housing with a trapezoidal engaging portion provided on a male mold, holding the housing by contacting tightly an inner wall of the hollow body with the trapezoidal engaging portion of the male mold to align the center of the male mold with that of the housing, and injecting a rubber material into a packing ring forming space uniformly defined by one of both of the male and female mold through a rubber supply paths of the housing. The housing having the hollow body with tapered shoulder, a male mold having the trapezoidal engaging portion and a female mold beveled or thinned at the open edge are employed for implementing the method.

3 Claims, 6 Drawing Sheets

HOUSING HAVING PROTRUSIONS TO BIND WITH MOLDS FOR MOLDING INTEGRAL PACKING RING

This application is a division of prior application Ser. No. 08/961,071 filed Oct. 30, 1997, now U.S. Pat. No. 5,846,468, which is a continuation of Ser. No. 08/506,337 filed Jul. 24, 1995, abandoned.

BACKGROUND OF THE INVENTION

1. Field of the Invention

The present invention relates to a method of manufacturing a waterproof connector housing in which is formed is a packing ring that constitutes an integral part of the housing, and to a housing and apparatus to be employed in such method.

2. Description of the Prior Art

U.S. Pat. No. 4,842,540, there is disclosed, as shown in FIG. 10 wherein, a method of manufacturing a waterproof connector housing wherein is formed is a packing ring which is an integral part of the housing.

Figure 10:
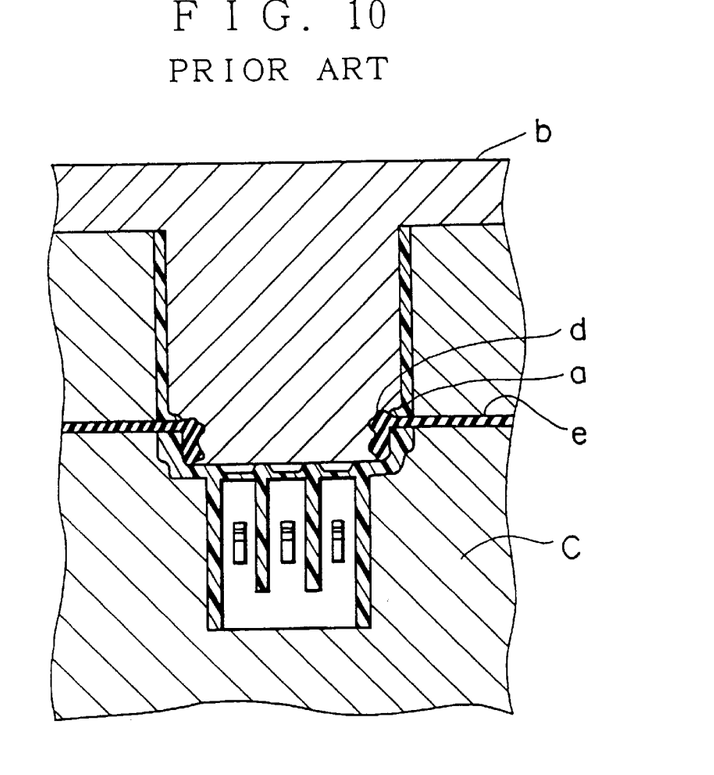
FIG. 10 is an explanatory diagram of a conventional method for integrally forming a packing ring for a housing.

In accordance with the method shown in FIG. 10, a housing (a), which is separately formed, is located between a male metal mold (b) and a female metal mold (c), and a rubber material is introduced through a rubber supply path (e) into a space (d) provided in the male metal mold (b) for forming a packing ring. In this manner, a packing ring, which is an integral part of the housing, is formed.

Figure 11:
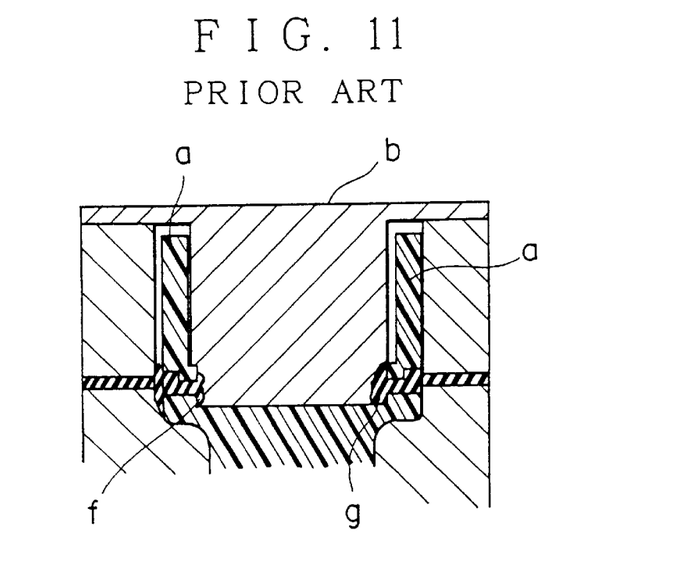
FIG. 11 is an explanatory diagram showing a state in which the housing is eccentrically positioned relative to the male metal mold of FIG. 10.

According to the above described manufacturing method, however, when there is a dimensional difference from an intended size of the housing (a) which is held in the molds, a clearance (a so-called "play") is formed between the male metal mold (b) and the housing (a), as is shown in a specific diagram of FIG. 11, so that the center of the male metal mold (b) and that of the housing (a) are out of alignment and the housing (a) may be placed at an off-centered position. Since the off-centered positioning of the housing (a) results in a variation in width of the space (d), depending on the angular location, the thickness of the formed packing ring may vary at places, such as having a thin portion (f) and a thick portion (g), so that the function of waterproofing by the thus formed packing ring is degraded and unusable, and defective units are produced.

To prevent the housing (a) from the off-centered positioning, the center of the male metal mold (b) and that of the housing (a) should be aligned with each other. Accordingly, it has been necessary to particularly prepare respective male metal molds (b) for preformed housings (a). Further, if housings are manufactured in a multiple cavity production, the same number of metal molds have to be prepared, and such metal molds are also required to have a high accuracy. This results in an increase of manufacturing costs and problems encountered with such complicated manufacturing process.

SUMMARY OF THE INVENTION

It is therefore an object of the present invention to eliminate the problems encountered with the prior art methods; to provide a method of manufacturing a waterproof connector housing wherein a housing can be easily placed in a predetermined position in a metal mold prior to forming a packing ring which is an integral part of the housing; to provide a uniformly formed packing ring; and to provide a housing and an apparatus to be employed for such method of manufacturing.

To achieve the above objective, according to one aspect of the present invention, there is provided a method of manufacturing a waterproof connector housing, wherein a formed housing is placed between male and female metal molds and a rubber material is introduced into a packing ring-forming space, which is provided at one or both of the male and female metal molds, so as to form a packing ring that is an integral part of the housing, comprising the steps of engaging the housing with a trapezoidal engaging portion provided on the male metal mold, and introducing the rubber material after contacting an inner wall of the housing tightly with the engaging portion of the male metal mold.

According to another aspect of the present invention, there is provided a method of manufacturing a waterproof connector housing, wherein a formed housing is placed between male and female metal molds and a rubber material is introduced into a packing ring-forming space which is provided at one or both of the male and female metal molds so as to form a packing ring as an integral part of the housing, comprising the steps of providing tapered protrusions on an outer wall of the housing, which protrusions increase in height along a direction toward an open end of the female metal mold, pressing the tapered protrusion with an inner wall of the female metal mold to bring the housing tightly in contact with the female metal mold when the female metal mold is mounted, and introducing the rubber material.

According to still another aspect of the present invention, there is provided a housing, which is for manufacturing a waterproof connector housing having a packing ring that is an integral part of the housing, being characterized in that tapered protrusions are provided on an outer peripheral wall of the housing and in the proximity of openings of rubber supply paths, which tapered protrusions are formed in such a manner as to increase their height along a direction toward a juncture of the male and female metal molds.

According to yet another aspect of the present invention, there is provided an apparatus for producing a waterproof connector housing having male and female metal molds, each of which has an engaging portion for the housing and rubber supply paths and a packing ring-forming space on one or both of the male and female metal molds, wherein the housing is placed between the male and female metal molds and a rubber material is introduced into the packing ring-forming space through the rubber supply paths to form a packing ring which is an integral part of the housing, being characterized in that a trapezoidal engaging portion is formed on the male metal mold and an inner wall of the housing is tightly contacted with the trapezoidal engaging portion.

It is preferable for the female metal mold to provide an inclined surface at a portion where mold contacts are made with the housing.

According to said one aspect of the present invention, since a hollow body of a housing engages with the trapezoidal engaging portion formed on the male metal mold and the engaging portion of the male metal mold is tightly contacted with the inner wall of the hollow body of the housing, even when there is a small dimensional error at the inner diameter of the hollow body, the hollow body of the housing can be held tightly in the position in which the outer diameter of the trapezoidal engaging portion of the male metal mold matches with the inner diameter of the hollow body, and the center of the engaging portion can be aligned with the center of the housing. Therefore, a packing ring having a uniform thickness can be formed as an integral part of a housing.

According to said another aspect of the present invention, after a housing having tapered protrusions, on its outer wall, which protrusions are used as stocks for force fitting mounted on the male metal mold, since the housing and a female metal mold are contacted tightly by pressing the tapered protrusions with the peripheral wall of the female metal mold when both of the molds are engaged, it is possible to provide a tight fit between the tapered protrusions and the peripheral wall of the female metal mold at all times. Thus, even when there is a small variation in size at the inner wall of the housing, the center of the female metal mold and that of the housing can be aligned with each other. This facilitates the method of forming a packing ring, which has a uniform thickness, as an integral part of the housing.

According to said still another aspect of the present invention, since the tapered protrusions are increased in their height along a direction toward the juncture of the two metal molds in the proximity of openings of rubber supply paths, the housing is placed in firm and tight contact with the female metal mold by the action of the tapered protrusions even if there is a slight difference in size in the outer wall of the housing, whereby such difference is compensated for by the tapered protrusion. Therefore, the alignment of the center of the housing with that of the metal mold is facilitated.

According to said yet another aspect of the present invention, since the engaging portion of the male metal mold is formed into a trapezoidal shape, it is possible to hold the hollow body of the housing tightly at the trapezoidal engaging portion of the male metal mold, at a position where the outer diameter of the mold coincides with the inner diameter of the hollow body of the housing. Therefore, even if there is a slight difference in size in the hollow body of the housing, the hollow body can be held tightly by the engaging portion at the position where an outer diameter of the trapezoidal engaging portion coincides with an inner diameter of the hollow body, thereby the center of the housing and that of the metal mold can be easily aligned with each other.

Further, by providing the female metal mold with an inclined surface to be contacted by the housing, relative-axial movement of the housing with respect to the mold is prevented from occuring so that the housing can be held securely, and the accuracy in forming of a packing ring is greatly improved.

In addition, according to the present invention, since the center of the housing and the center of the metal mold can be easily aligned with each other, the rubber material is prevented from leaking during the process of manufacturing the packing ring and defective products are prevented from being produced.

DETAILED DESCRIPTION OF THE PREFERRED EMBODIMENTS

Figure 1:
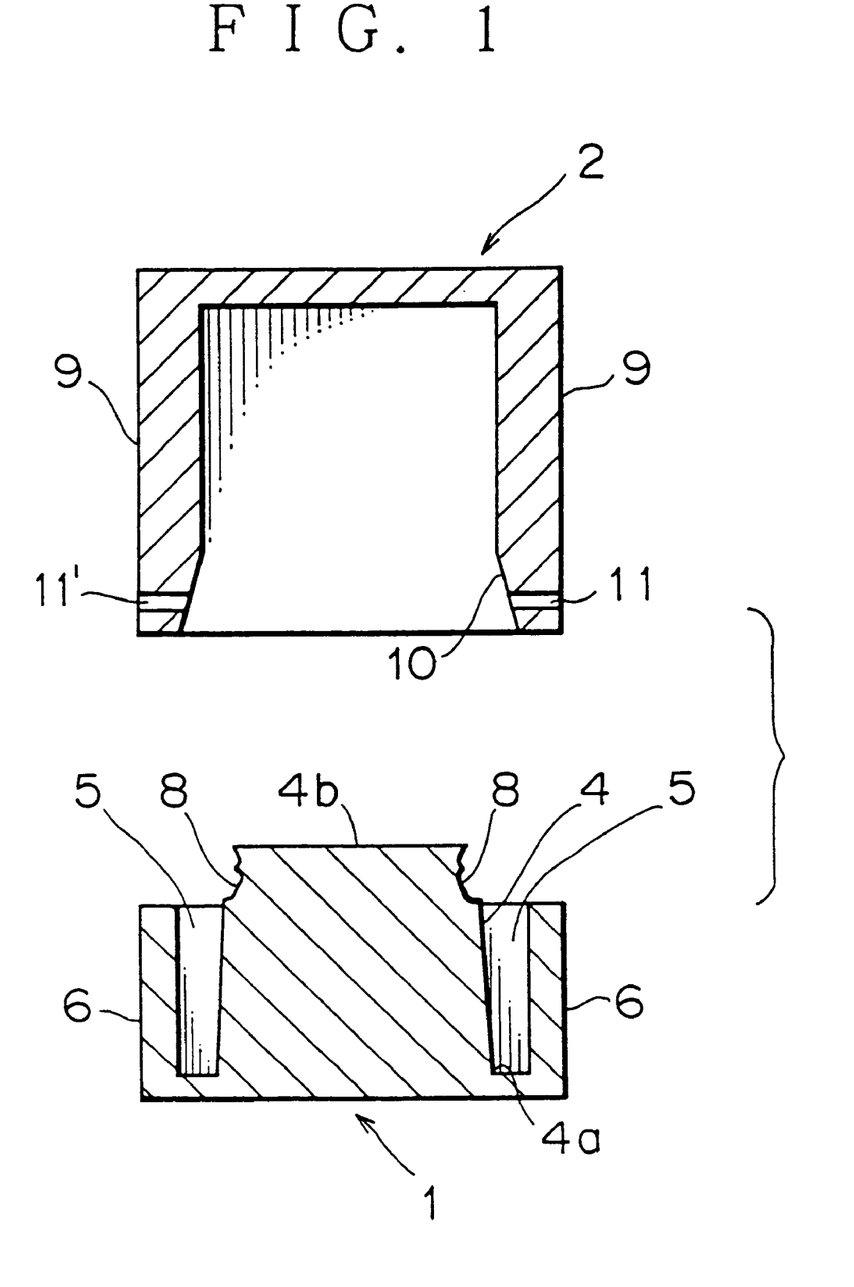
FIG. 1 is a cross-sectional view of a male metal mold and a female metal mold according to an embodiment of the present invention.

Now referring to FIG. 1, there is shown a cross-sectional view of a male metal mold 1 and a female metal mold 2 according to one preferred embodiment of the present invention.

Figure 2:
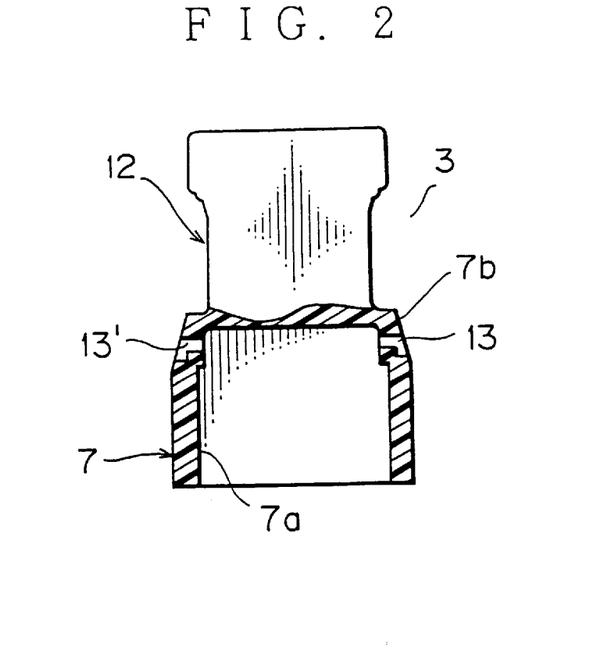
FIG. 2 is a partial cross-sectional view of a housing held between the male and female metal molds of FIG. 1.

As is shown in FIG. 2, the male metal mold 1 and the female metal mold 2 constitute a set of upper and lower molds to be employed for forming a packing ring which is an integral part of a housing 3.

The male metal mold 1 has a trapezoidal engaging portion 4 at its central portion, a housing retaining portion 5 around the engaging portion 4 being defined by a predetermined gap, and a peripheral wall 6 communicated with a base 4a of the engaging portion 4 at the bottom of the retaining portion 5.

The engaging portion 4 is employed to be engaged with and mounted on a hollow body 7 of the housing 3. A configuration of the engaging portion 4 is so arranged that a diameter of the base 4a is slightly larger than that of an inner wall 7a of the hollow body 7, the diameter of a top end 4b is smaller than the diameter of the inner wall 7a of the hollow body 7, and a diameter of the engaging portion is gradually reduced from the base 4a to the top end 4b to provide a trapezoidal shape. A space 8 for forming a packing ring is provided at the periphery of the top end 4b.

Figure 3:
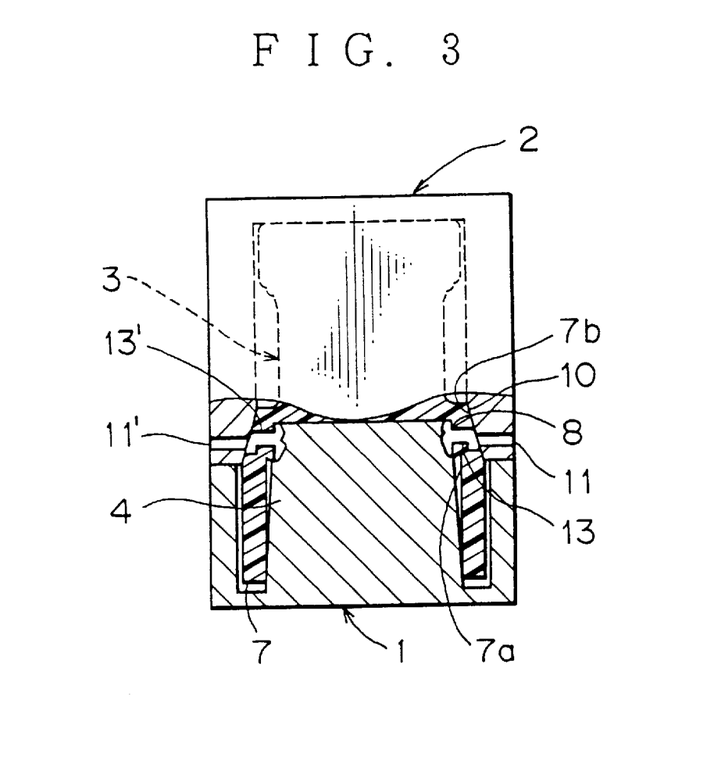
FIG. 3 is a cross sectional view of a housing held between the male and female metal molds of FIG. 1.

When the housing 3 is engaged with the engaging portion 4, the housing is contacted tightly with the engaging portion 4 at a portion where the diameter of the trapezoidal engaging portion 4 equals to the diameter of the inner wall 7a of the hollow body 7 of the housing 3, as is shown in FIG. 3. Hence, the center of the housing 3 is aligned with the center of the engaging portion 4. In other words, automatic positioning or centering of the housing 3 with the male metal mold 1 is performed.

The female metal mold 2 is a mortar shaped metal mold to be mounted on the male metal mold 1. A thin, beveled portion 10 tapered towards the opening is formed at the open edge of the peripheral wall 9 of the female metal mold, and rubber supply paths 11 and 11' for introducing a rubber material to form the packing ring are provided at symmetrical positions about the beveled portion or tapered surface 10.

When the female metal mold 2 is mounted on the male metal mold 1 which is engaged with the housing 3, as is shown in FIG. 3, the tapered surface 10 of the female metal mold 2 is brought into a close contact with the tapered peripheral wall 7b of the housing 3 and holding the housing 3 in position.

As is shown in FIG. 2, the housing 3 comprises the hollow body 7 and a terminal retaining portion 12. Rubber supply paths 13 and 13', which penetrate through the hollow body 7, are formed at locations which are in close proximity to the juncture of the hollow body 7 and the terminal retaining portion 12 in order to communicate with the rubber supply paths 11 and 11' of the female metal mold 2. The rubber supply paths 13 and 13' are provided to penetrate the tapered peripheral wall 7b of the hollow body 7.

After the female metal mold 2 has been mounted on the male metal mold 1, a rubber material is injected into the space 8 through the rubber supply paths 11 and 11' to form a packing ring of the housing 3. The rubber material is not limited to a specific composition, but preferably, is a liquid silicone rubber of an addition reaction type containing 75 ppm/cm$^3$ of siloxane, which has a low boiling point than that of $[(CH_3)_2SiO]_{1-10}$. A liquid silicone rubber layer is formed on the housing 3 and, by vulcanizing the thus-formed liquid silicone rubber layer, a packing ring is formed as an integral part of the housing 3.

Figure 4:
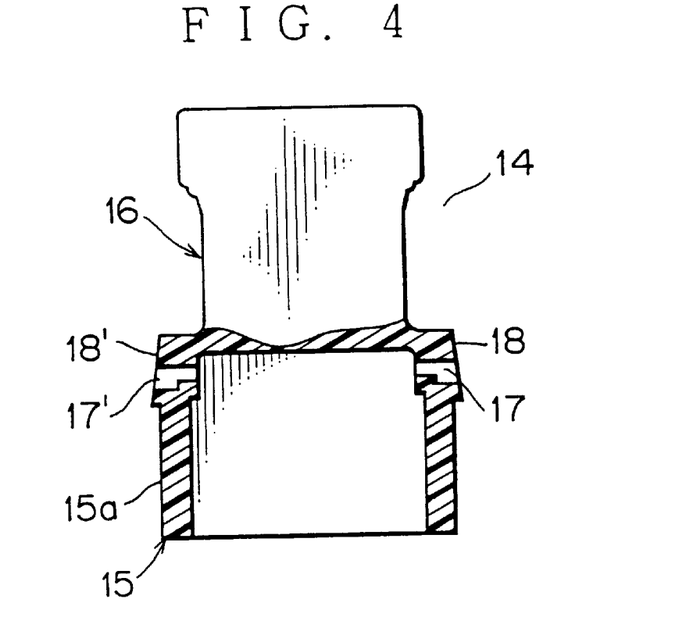
FIG. 4 is a partial cross-sectional view of a housing according to another embodiment of the present invention.
Figure 5:
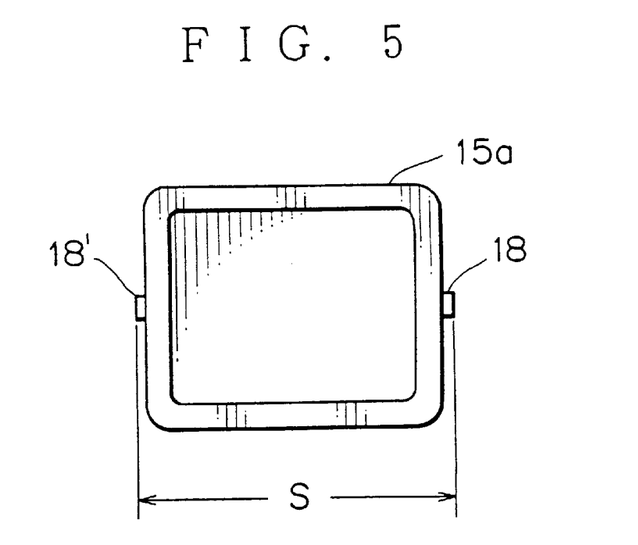
FIG. 5 is a plan view of the housing of FIG. 4.

FIG. 4 is a side view of a housing 14 according to another preferred embodiment of the present invention, and FIG. 5 is a plan view of the housing of FIG. 4.

The housing 14 comprises a hollow body 15 and a terminal retaining portion 16. Rubber supply paths 17 and 17' that penetrate through the hollow body 15 are provided at symmetrical right and left positions about the center of the housing 14 and in the vicinity of the juncture of the hollow body 15 and the terminal retaining portion 16.

Figure 6:
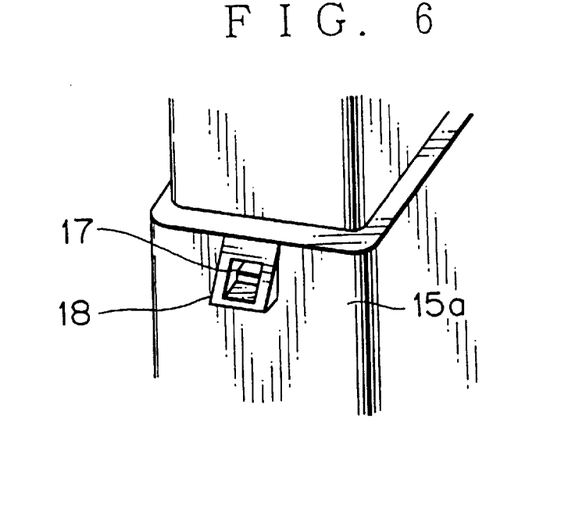
FIG. 6 is an explanatory diagram showing a tapered protrusion on the housing of FIG. 4.

Tapered protrusions 18 and 18', which project outwardly from the peripheral wall along a direction toward the juncture of the molds, are formed on the outer wall 15a of the hollow body 15 in the proximity of each open edge of the rubber supply paths 17 and 17'. The tapered protrusions 18 and 18' are used as stocks for force fitting when a female metal mold 19 (see FIG. 7) is mounted on the housing 14. The maximum interval (S) between the tapered protrusions 18 and 18' is arranged to be greater than the inner diameter of a step 20a of the female metal mold 19, which will be described hereinafter. As is shown in FIG. 6, each of the tapered protrusions 18 and 18' has a square shape so that they can easily be pressed down by the peripheral wall 20 of the female metal mold 19.

Figure 7:
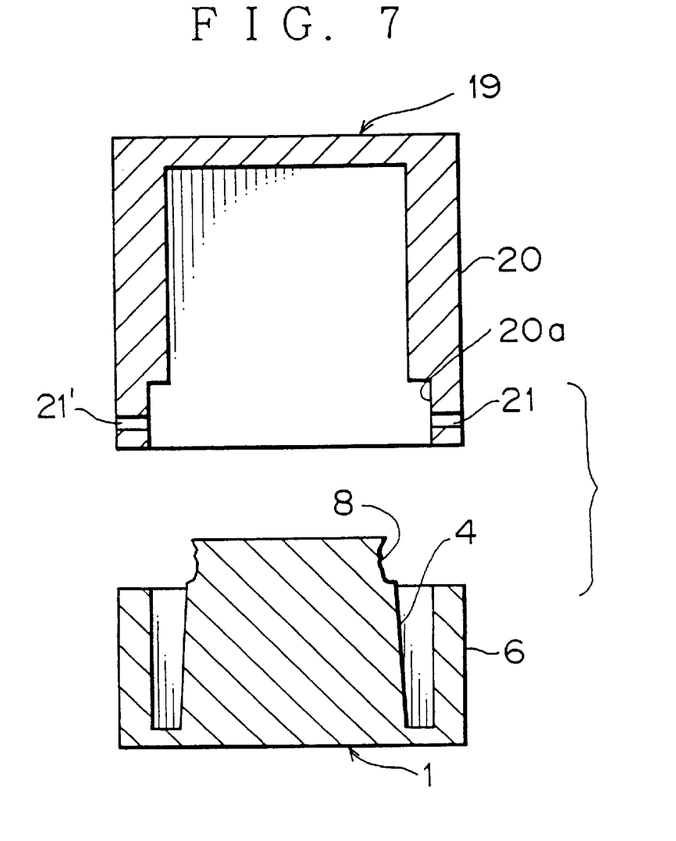
FIG. 7 is a cross-sectional view of a female metal mold and a male metal mold according to still another embodiment of the present invention.

The female metal mold 19 is a mortar shaped mold to be mounted on the male metal mold 1. The step 20a, which is thinned along a direction toward the opening, is provided at the edge portion of the opening of the peripheral wall 20. The step 20a is provided with rubber supply paths 21 and 21' for forming the packing ring, both of which are communicated, respectively, with the rubber supply paths 17 and 17' of the housing 14. The inner diameter of the step 20a is so formed that it is slightly larger than the outer dimension of the hollow body 15 of the housing 14.

Figure 8:
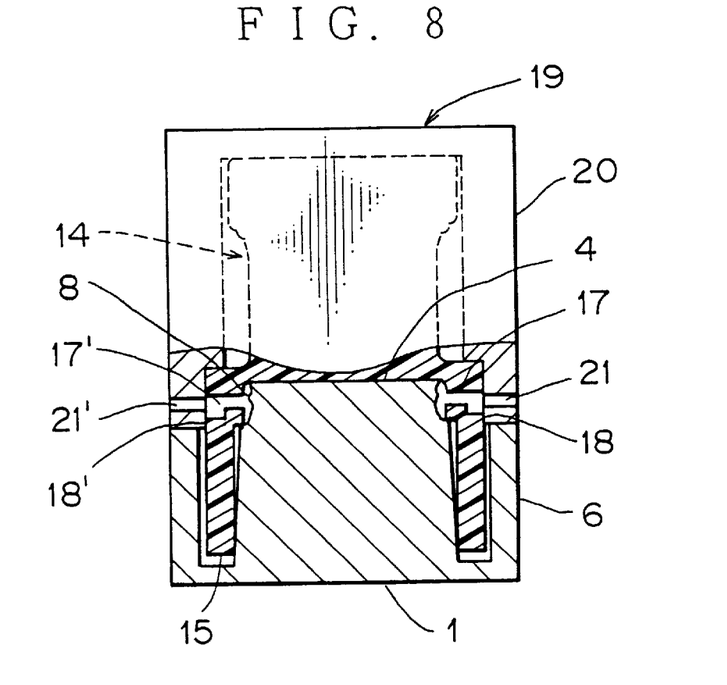
FIG. 8 is a cross-sectional view in which a housing is held between the male and female molds of FIG. 7.

To form a packing ring which is an integral part of the housing 14, the hollow body 15 of the housing 14 engages with the male metal mold 1 in the same manner as in the aforesaid embodiment, and as is shown in FIG. 8, the peripheral wall 6 of the male metal mold 1 and the peripheral wall 20 of the female metal mold 19 are fitted together. During this process, as the female metal mold 19 is forced to fit the housing 14, the tapered protrusions 18 and 18' of the housing 14 are forced to fit the end portion of the peripheral wall 20 of the female metal mold 19, and the end potion of the wall 20 is engaged with the peripheral wall 6 of the male metal mold 1.

Figure 9:
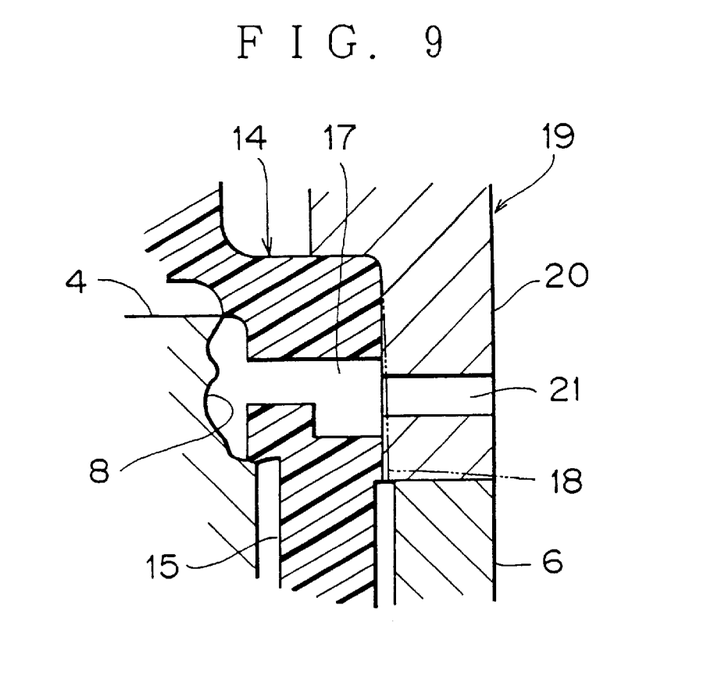
FIG. 9 is an explanatory diagram showing a state in which a peripheral wall of the female metal mold of FIG. 7 presses a tapered protrusion on the housing.

As a result, the housing 14 is held tightly against the stepped portion 20a of the female metal mold 19 with the tapered protrusions 18 and 18', and the center of the female metal mold 19 and the center of the housing 14 are aligned with each other. Accordingly, even if there is a slight dimensional error in the outer diameter of the hollow body 15 of the housing 14, it is compensated for by the stocks for force fitting or the tapered protrusions 18 and 18', and the center of the female metal mold 19 and the center of the housing 14 can be aligned with each other at all times.

After the female metal mold 19 has been mounted on the male metal mold 1, a rubber material is introduced into the space 8 through the rubber supply paths 21 and 21' of the female metal mold 19 and the rubber supply paths 17 and 17' of the housing 14, and a packing ring can be formed as an integral part of the housing 14. Further, since the female mold 19 and the housing 14 are held by aligning with their centers on the same axis, a packing ring having a uniform thickness can be formed.

According to the present invention, since the engaging portion of the male metal mold is formed into a trapezoidal shape, and is held tightly against the inner wall of the hollow body of the housing, even if there is a slight dimensional error in the diameter of the inner wall of the hollow body of the housing, the center of the engaging portion and that of the housing can easily be aligned with each other, and the productivity for forming packing rings as integral parts of the housing with uniform thicknesses is emphatically increased. Further, packing rings that have uniform thicknesses can be provided regardless of the accuracy of the metal molds in use, and thereby reducing manufacturing costs.

Further, according to the present invention, the housing, which carries tapered protrusions on its outer wall as stocks for force fitting, is mounted on the male metal mold and the tapered protrusions are pressed down, for force fitting, by the peripheral wall of the female metal mold when both of the metal molds are engaged with each other. Therefore, even if there is a slight dimensional error in the size of the inner wall of the housing, the center of the female metal mold can be aligned with the center of the housing. This in turn results in an increase of the productivity of the process in forming packing rings having uniform thicknesses.

Still further, according to the present invention, since the housing has the tapered protrusions in the proximity of the edges of the openings of the rubber supply paths of the outer wall of the housing, even if there is a slight dimensional error in the size of the outer wall of the housing, such error can be adjusted by the tapered protrusions when the housing is fitted in the metal mold. Therefore, it is not required to increase the accuracy of metal molds in manufacturing housings, and this results in a reduction of manufacturing costs.

Yet further, according to the present invention, as has been described in relation to the effects of the manufacturing method, the productivity of the process to form packing rings having uniform thicknesses as integral parts of the housings is considerably increased. Since the female metal mold is provided with a beveled surface which comes into contact with the housing, the up-and-down movement of the housing is prevented from occuring and the housing is held stably. This also results in an improvement of accuracy in forming packing rings.

Moreover, in accordance with the present invention, the leaking of rubber material can be prevented from occuring when injecting the rubber material, and this results in advantages in manufacturing rubber packing rings by eliminating defective products in the process.

It is to be understood by those skilled in the art that the foregoing description relates only to a preferred embodiments of the invention and that various changes and modifications may be made in the invention without departing from the spirit and scope thereof.

What is claimed is:

1. For use in manufacturing a waterproof connector having a housing containing a packing ring as an integral part thereof, wherein said housing is positioned between a male mold and a female mold for the formation of said packing ring in said housing, said housing comprising:

a housing body having a substantially continuous external wall;

a tapered protrusion projecting laterally from said external wall of said housing body for engagement with an interior surface of said female mold, a passage extending through said tapered protrusion and said wall of said housing body forming a rubber supply path for injecting rubber for said packing ring when said housing body is positioned between said male and female molds, and the extent said protrusion projects from said external wall of said housing body increasing in a direction serving to bind said housing when it is installed between said molds.

2. The housing according to claim 1 in which the extent said protrusion projects from said external wall of said housing body being adapted to increase along a direction corresponding to that along which said female mold is adapted to overlie said male mold when said male and female molds are applied to said housing for the injection of rubber to form said packing ring.

3. The housing according to claim 1 in which corresponding protrusions are disposed on opposite sides of said external wall of said housing body for engagement with said interior surface of said female mold on opposite sides thereof.

* * * * *